United States Patent [19]

Mourot

[11] Patent Number: 5,566,172
[45] Date of Patent: Oct. 15, 1996

[54] METHOD FOR TRANSMITTING INFORMATION AT HIGH SPEED BY MULTIPLE BURST ALLOCATION AND ASSOCIATED RECEIVING METHOD AND DEVICE

[75] Inventor: Christophe Mourot, Asnieres, France

[73] Assignee: Alcatel N.V., Amsterdam, Netherlands

[21] Appl. No.: 175,555

[22] Filed: Dec. 30, 1993

[30] Foreign Application Priority Data

Dec. 30, 1992 [FR] France ................................. 92 15934

[51] Int. Cl.$^6$ ..................................................... H03H 7/30
[52] U.S. Cl. ................................ 370/79; 375/231; 370/99
[58] Field of Search .................................. 375/229, 231, 375/232; 370/95.1, 95.3, 17, 79, 111, 82, 83, 84, 100.1, 102, 99, 110.1; 455/33.1–33.3, 34.1, 34.2

[56] References Cited

U.S. PATENT DOCUMENTS

| | | | |
|---|---|---|---|
| 4,330,858 | 5/1982 | Choquet | 370/111 |
| 5,050,166 | 9/1991 | Cantoni et al. | 370/95.1 |
| 5,127,051 | 6/1992 | Chan et al. | 375/13 |
| 5,155,742 | 10/1992 | Ariyavisitakul et al. | 375/13 |
| 5,163,045 | 11/1992 | Caram et al. | 370/94.1 |
| 5,199,047 | 3/1993 | Koch | 375/13 |
| 5,303,226 | 4/1994 | Okanoue et al. | 375/13 |

FOREIGN PATENT DOCUMENTS

| | | |
|---|---|---|
| 0399612 | 11/1990 | European Pat. Off. . |
| WO8805981 | 8/1988 | WIPO . |

*Primary Examiner*—Douglas W. Olms
*Assistant Examiner*—Ajit Patel
*Attorney, Agent, or Firm*—Sughrue, Mion, Zinn, Macpeak & Seas

[57] ABSTRACT

In a method of transmitting information at high speed by allocation of multiple bursts within a transmission frame each including information symbols and system symbols a user is allocated a plurality of adjacent bursts and at least one of the system symbols between the information symbols of the first of the adjacent bursts and the information symbols of the last of the adjacent bursts is replaced with an information symbol to form a superburst. The associated receiving method includes a stage for recognizing reception of a superburst and a stage for processing the superburst to extract the information symbols from it. There are applications relating to transmission and reception equipments of mobile radio communication systems.

28 Claims, 3 Drawing Sheets

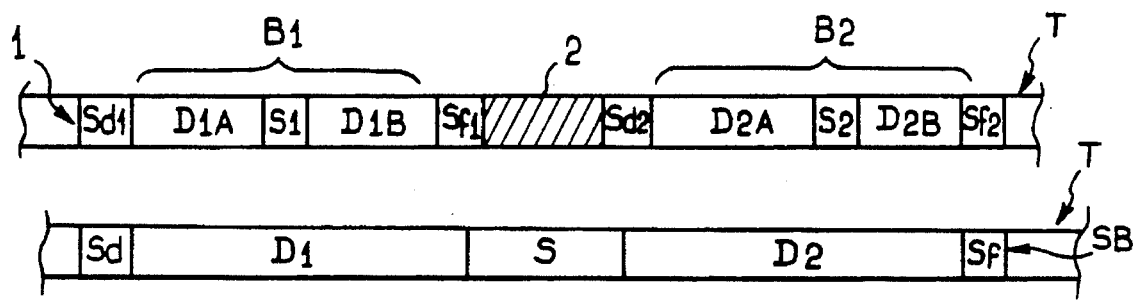
FIG_1
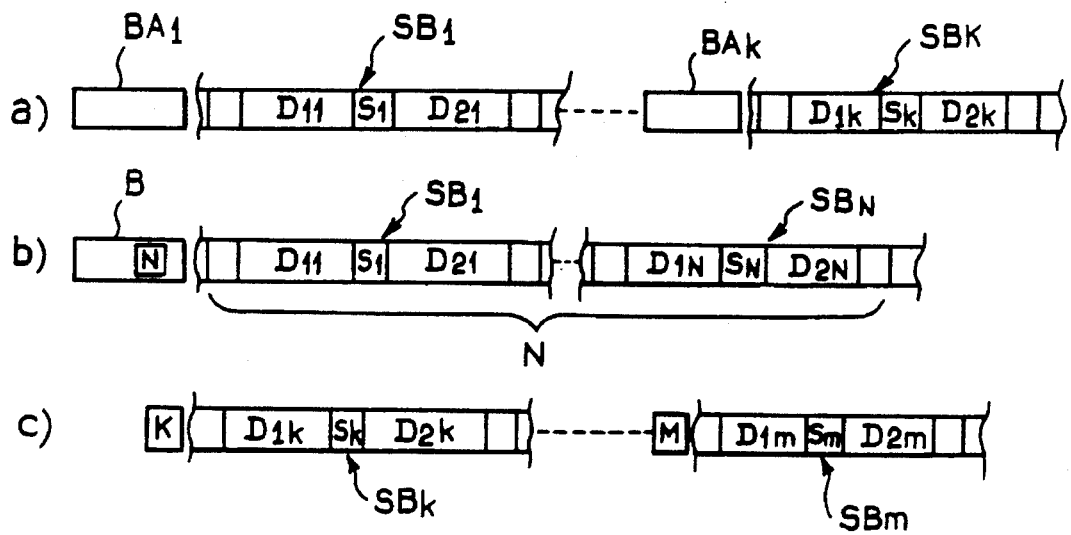
FIG_2
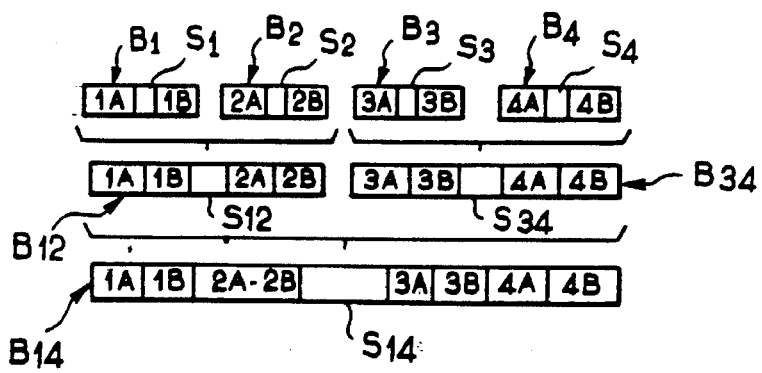
FIG_3

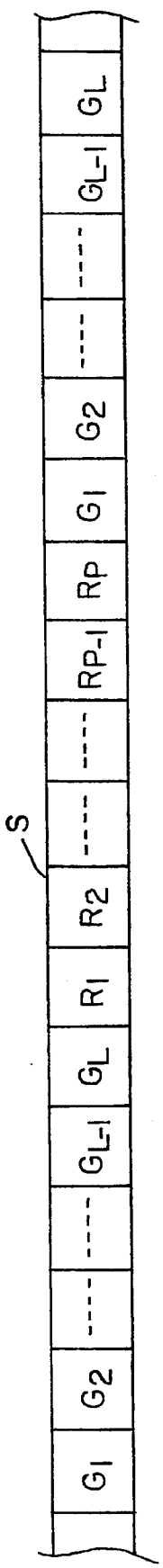
FIG_4
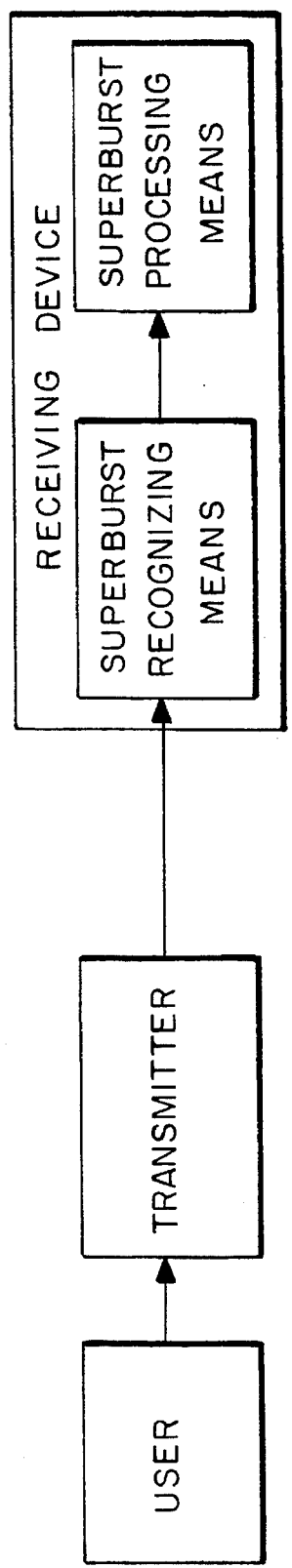
FIG_5

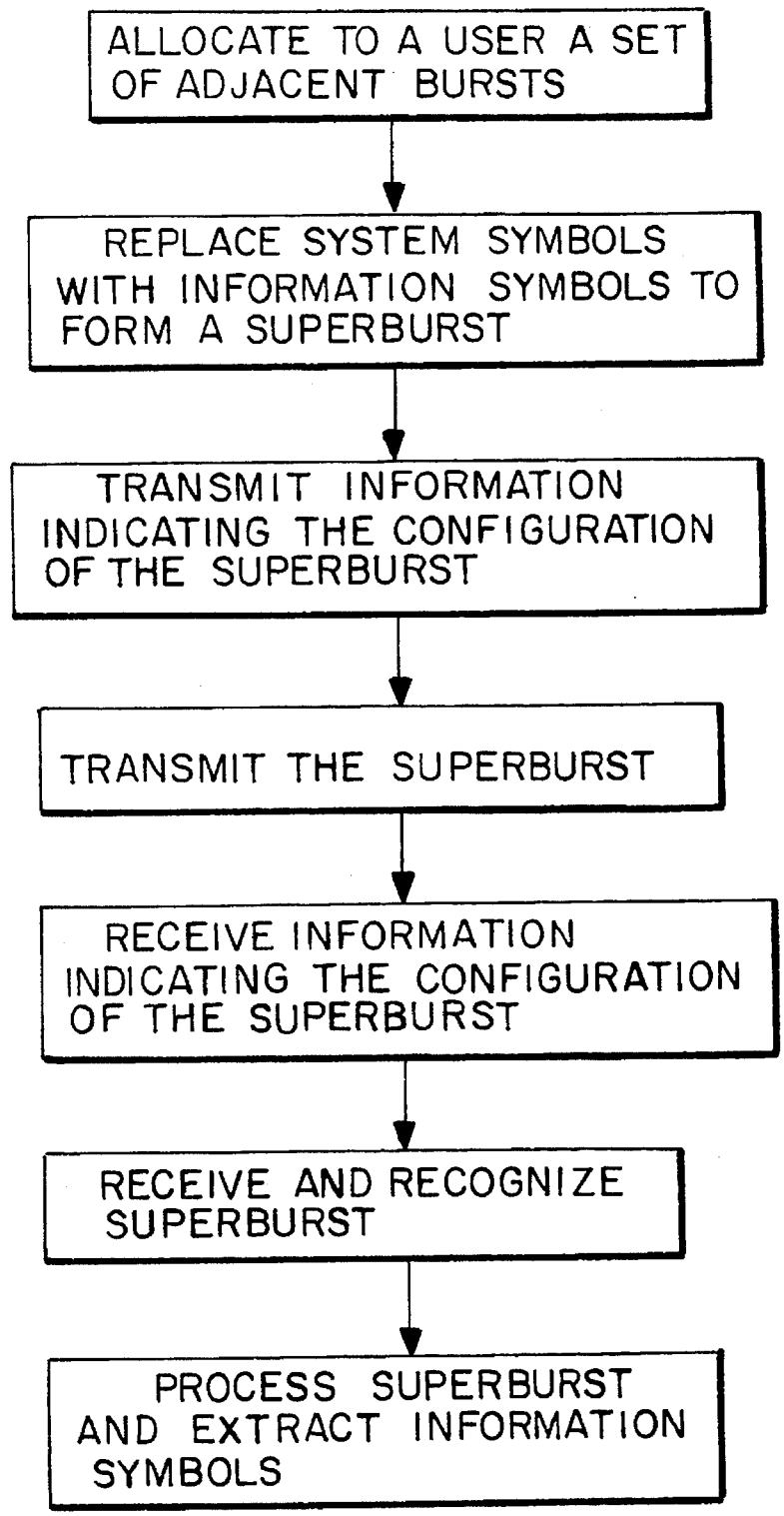
FIG_6

METHOD FOR TRANSMITTING INFORMATION AT HIGH SPEED BY MULTIPLE BURST ALLOCATION AND ASSOCIATED RECEIVING METHOD AND DEVICE

BACKGROUND OF THE INVENTION

1. Field of the Invention

The present invention concerns a method for transmitting information at high speed by allocation of multiple bursts. It also concerns an associated receiving method and device.

2. Description of the Prior Art

In a time division multiple access (TDMA) system each user utilizes a given frequency during a given time slot, the other time slots being reserved for other users. The structure of the signal is based on the "burst" concept. A burst contains start and end symbols which are known to the receiver, information symbols which constitute the payload of a burst and a learning sequence known to the receiver and used for synchronization, channel estimation and equalization.

The efficiency of a burst is defined as the ratio:

$$eu = \frac{payload}{start + payload + sequence + end}$$

The efficiency $eu$ is proportional to the payload. A specific number Nb of these bursts is inserted into a higher entity called a frame which repeats periodically. The data signalling rate for a user with access to one burst per frame is:

$$Du = \frac{ncu}{dt}$$

where $ncu$ is the number of information symbols transmitted by this user, i.e. the payload of his burst, and $dt$ is the duration of a frame.

In communications by radio the behavior of the transmission channel varies. In order to be able to detect a received burst and determine the value of the information symbols, the receiver must know how the transmission channel behaves during the transmission of the burst. An estimator device uses the learning sequence in the middle of the burst for this purpose. The characteristics of the learning sequence are chosen according to the characteristics of the transmission channel. The further the burst extends on each side of the learning sequence, i.e. the longer the payload relative to the learning sequence, the less reliable at the ends of the burst is the impulse response of the channel as estimated at the center of the burst. The learning sequence is usually located in the middle of the burst and the payload, whose size depends on that of the sequence, is equally distributed on each side of it in order minimize fluctuations of the channel and therefore variations in its impulse response over the duration of the burst.

If a user needs to transmit at a data signalling rate greater than that corresponding to one burst, one solution is to allocate that user a plurality of not necessarily adjacent bursts in the same frame. If he is allocated $n$ bursts, then this user acquires a data signalling rate equal to:

$$\frac{n \cdot ncu}{dt}$$

On the other hand, the transmission efficiency is still equal to $eu$.

An object of the present invention is to propose a method of transmitting information at high speed by allocation of multiple bursts which also contributes to improving transmission efficiency.

SUMMARY OF THE INVENTION

In one aspect, the invention consists in a method of transmitting information at high speed by allocation of multiple bursts within a transmission frame each including information symbols and system symbols in which a user is allocated a plurality of adjacent bursts and at least one of said system symbols between the information symbols of the first of said adjacent bursts and the information symbols of the last of said adjacent bursts is replaced with an information symbol to form a superburst.

This improves transmission efficiency.

If each adjacent burst includes information symbols and system symbols known to a receiver including start symbols, end symbols and a learning sequence, the respective learning sequences and the respective information symbols of said adjacent bursts are advantageously rearranged so that said superburst includes a single learning sequence.

This produces superbursts within which the learning and information symbols are rearranged. Efficiency is thereby considerably increased. The learning sequence of a superburst can be the same as that of a normal burst if the behavior of the channel allows this, or longer if necessary. However, if the learning sequence needed to have a length exceeding the sum of the lengths of the learning sequences of the normal bursts concatenated in the superbursts, then the method according to the invention would not be able to achieve the expected improvement in efficiency.

According to another aspect of the invention a method of receiving information transmitted at high speed by allocation of multiple bursts within a transmission frame associated with the above transmission method includes a stage for recognizing reception of a superburst and further includes, in the event that a superburst is recognized, a stage for processing said superburst and extracting the information symbols from it.

According to a further aspect of the invention a device for receiving information transmitted at high speed by allocation of multiple bursts within a transmission frame using the above receiving method includes means for recognizing reception of one or more superbursts generated by implementation of the above transmission method and means for processing said superbursts received and extracting therefrom the information symbols contained in the original bursts concatenated.

According to a still further aspect of the invention a device for transmitting information at high speed by allocation of multiple bursts within a transmission frame includes means for implementing the above transmission method.

Other features and advantages of the invention emerge from the following description given by way of non-limiting example only with reference to the appended drawings.

BRIEF DESCRIPTION OF THE DRAWINGS

FIG. 1 shows the structure of two adjacent bursts within a frame and the structure of a superburst obtained by the method according to the invention.

FIG. 2 shows three specific modes of transmission of information relating to the transmission of superbursts.

FIG. 3 shows a specific implementation of the method according to the invention with four adjacent bursts allocated to the same user within a frame.

FIG. 4 shows the structure of a learning sequence.

FIG. 5 shows a device for implementing the method of the present invention.

FIG. 6 is a flow diagram containing the steps of the present invention.

DETAILED DESCRIPTION OF THE PREFERRED EMBODIMENTS

One implementation of the method according to the invention is now described with reference to FIG. 1 which shows a conventional configuration 1 with two adjacent bursts B1, B2 within a frame T the other bursts of which are not shown, and a similar representation of a configuration of a superburst SB obtained by the method according to the invention. Each original burst B1, B2 contains start symbols Sd1, Sd2 and end symbols Sf1, Sf2 which are known to the receiver, a "payload" constituted by information symbols and divided into two parts D1A, D1B; D2A, D2B between which is inserted a learning sequence S1; S2 whose length depends on the expected behavior of the transmission channels. First the behavior of the channel is assessed in order to be able either to choose an existing sequence or to generate a new sequence, for effective estimation of the transmission channel. Guard symbols 2 used for synchronization purposes and to prevent any overlapping of two consecutive bursts, especially if they are addressed to two different receivers, are usually provided between the two adjacent bursts B1, B2. The superbursts SB also contain start and end symbols Sd, Sf and a payload divided into two parts D1, D2 between which is the single learning sequence S.

The sending station can advise the receiver of the imminent transmission of superbursts in various ways. Referring to FIG. 2, with a first option a), a warning burst BA1, BAk containing information representing the configuration of a superburst is transmitted before each frame containing at least one superburst SB1, SBk constituted by a payload D11, D21; D1k, D2k and a single learning sequence S1, Sk. This information includes the number of adjacent bursts concatenated in the superburst concerned, the position of the learning sequence within the superburst and the length of the learning sequence. The characteristics of the learning sequence can also be transmitted. A learning sequence is usually constituted by L guard symbols followed by P reference symbols followed by L guard symbols where L is equal to the length of the impulse response of the channel in symbol periods and P must be greater than or equal to L+1 (see FIG. 4). A shorter or longer channel can therefore be estimated according to the values of P and L. It is therefore advantageous to transmit in the information representing the configuration of a superburst either the values of P and L or a reference number which gives these values automatically.

In a second option b), a single warning burst B is transmitted at the start of a stream of N frames each containing a superburst SB1, SBN and the warning burst contains the number N of frames containing superbursts in addition to the previously mentioned configuration information. This option is feasible if the superbursts transmitted have the same configuration.

In a third option c), if characteristic superburst configurations are listed and known in the receiving equipment the volume of warning information to be transmitted can be significantly reduced by no longer transmitting preliminary bursts, transmitting instead a single signalling indication K, M for each superburst SBk, SBm. The receiving equipment is designed to interpret this signalling and to prepare to receive superbursts with the configuration associated with it.

The method according to the invention can be applied to a number of adjacent bursts greater than 2. Referring to FIG. 3, it is feasible to concatenate four adjacent bursts B1, B2, B3, B4 each having a payload 1A, 1B; 2A, 2B; 3A, 3B; 4A, 4B and a learning sequence S1, S2, S3, S4. A first stage of concatenation yields two superbursts B12, B34 respectively obtained by concatenating bursts B1, B2 and bursts B3, B4, each superburst including a learning sequence S12, S34. In a second stage of concatenation the two superbursts are concatenated to generate a superburst B14 including a single learning sequence S14 and a payload constituted by the information symbols 1A, 1B; 2A, 2B; 3A, 3B; 4A, 4B from the original bursts B1, B2, B3, B4. The transmission efficiency for such superbursts is significantly increased as compared with that for transmitting bursts separately, provided that the length of the single learning sequence is less than four times the length of the learning sequence of an original burst. This depends on the behavior of the transmission channel.

The receiving method associated with the transmission method according to the invention includes a stage for recognizing impending reception of one or more superbursts and a stage for processing the superburst(s). The recognition stage includes the reception of information representing the configuration of a superburst, including the number of bursts concatenated in a superburst, the location of the single learning sequence within the superburst and the length of the learning sequence. A learning sequence usually includes L guard symbols followed by P reference symbols followed by L guard symbols. If the transmission method according to the invention transmits the values P and L then the recognition stage of the receiving method associated with it further includes reception of the values P and L. If the transmission method according to the invention transmits a reference number giving these values P and L then the recognition stage of the receiving method must include reception and processing of said reference number to deduce from it said values P and L. The steps of the present invention are shown in the flow diagram of FIG. 6.

Various receiving modes are feasible for the various transmission options previously described. For example, referring to FIG. 2 (a), the recognition stage may comprise, before each superburst SB1, SBk is received, reception of a specific burst BA1, BAk containing said information representing the configuration of said superburst SB1, SBk. Referring to FIG. 2 (b), the recognition stage may also comprise the reception of information representing the number N of frames in which superbursts SB1, SBN are used. Referring to FIG. 2 (c), another option is to transmit first a configuration number K, M in the form of a signalling indication associated with a predetermined configuration of superbursts SBk, SBm to be received.

The receiving method according to the invention is implemented in a receiving device including, in addition to conventional means for receiving and processing the frames transmitted, means for recognizing reception of superbursts and means for processing these superbursts and extracting from them the information symbols contained in the concatenated original bursts (see FIG. 5).

The embodiment of the invention described so far can optimize transmission efficiency. A simpler implementation is feasible which can improve the data signalling rate even if the latter is not maximized.

For example, a superburst is formed from two adjacent bursts B1, B2 shown in FIG. 1 by substituting information symbols for the end symbol Sf1 of the first burst B1, the guard symbols 2 between the two bursts and the start symbol Sd2 of the second burst B2. This does not modify either the structure or the position of the learning sequences S1, S2 of each burst B1, B2.

In a degraded mode of operation the guard symbols 2 are retained and only the end and start symbols Sf1 and Sd2 between the two bursts B1, B2 are replaced by information symbols.

All start symbols, learning sequence symbols, end symbols and guard symbols are deemed to constitute system symbols. The system symbols thus identify all symbols which are not information symbols.

To summarize, the invention proposes means for substituting information symbols for some (at least one) system symbols between the start symbols Sd1 of a first burst B1 and the end symbols Sf2 of the last burst B2 of a set of adjacent bursts in order to constitute a superburst. Note that replacing two learning sequences S1, S2 of bursts B1, B2 by a single learning sequence S, as described above, is within the scope of the invention because this operation is of benefit only if the single sequence S has a length shorter than the sum of the lengths of the two original sequences S1, S2. The result is therefore as if certain symbols of one or both the original learning sequences S1, S2 were replaced with information symbols.

The invention naturally applies if the bursts do not comprise any learning sequence. This is relevant, for example, to systems which do not require equalization because the rate at which symbols are transmitted is relatively low in relation to the characteristics of the transmission channel.

The present invention is naturally not limited to the embodiments that have just been described which can be modified in many ways without departing from the scope of the invention. For example, the number of bursts concatenated is not limited to that stated in the examples described.

There is claimed:

1. A method of transmitting information to a receiver at high speed by allocation of multiple bursts within a transmission frame, each of said bursts including information symbols and system symbols, the method including the steps of: allocating to a user a plurality of adjacent bursts; and replacing at least one system symbol of said adjacent bursts with an information symbol to form a superburst.

2. The method according to claim 1, further including the step of advising the receiver of an imminent transmission of superbursts by transmitting information representing a configuration of said superbursts.

3. The method according to claim 2, wherein the advising step is executed prior to transmission of a superburst and said advising step includes transmitting the information in a specific burst, said information containing an indication of a number of bursts concatenated in said superburst.

4. The method according to claim 2, wherein the information includes indication of a number of frames in which superbursts are used.

5. The method according to claim 2, wherein each of said superbursts has a configuration which is known in advance by the receiver, each configuration being associated with a configuration number, wherein said information contains the configuration number corresponding to the configuration of superbursts to be transmitted.

6. The method according to claim 1, wherein each of said adjacent bursts includes information symbols and system symbols known to the receiver, said system symbols including start symbols, end symbols and a learning sequence, and wherein the learning sequences and the information symbols of each of said adjacent bursts are rearranged so that said superburst includes a single learning sequence.

7. The method according to claim 6, further including the step of advising the receiver of an imminent transmission of superbursts by transmitting information representing a configuration of a superburst including a number of said adjacent bursts concatenated in the superburst, a location of the single learning sequence within the superburst and a length of said single learning sequence.

8. The method according to claim 7, wherein said single learning sequence includes L guard symbols followed by P reference symbols followed by L guard symbols, and said information further includes positive values for P and L.

9. The method according to claim 7, wherein said single learning sequence includes L guard symbols followed by P reference symbols followed by L guard symbols, and said information further includes a reference number giving positive values for P and L.

10. The method according to claim 7, wherein the advising step is executed prior to transmission of a superburst and said advising step includes transmitting the information in a specific burst.

11. The method according to claim 7, wherein the information transmitted during the advising step further includes an indication of a number of frames in which superbursts are used.

12. The method according to claim 7, wherein each of said superbursts has a configuration which is known in advance by the receiver, each configuration being associated with a configuration number, wherein said information contains the configuration number corresponding to the configuration of superbursts to be transmitted.

13. The method according to claim 1 wherein the number of adjacent bursts allocated to the same user within a transmission frame is equal to two.

14. The method according to claim 1, wherein the transmission frame is a Time Division Multiple Access frame.

15. A method of receiving information transmitted at high speed by allocation of multiple bursts within a transmission frame associated with a method of transmitting information at high speed by allocation of multiple bursts within a transmission frame, each of said bursts including information symbols and system symbols, the transmitting method including the steps of: allocating to a user a plurality of adjacent bursts; and replacing at least one system symbol of said adjacent bursts with an information symbol to form a superburst, the receiving method including the steps of: recognizing reception of said superburst; and, in the event that said superburst is recognized, processing said superburst and extracting said information symbols therefrom.

16. The method according to claim 15, wherein the transmission frame is a Time Division Multiple Access frame.

17. A method of receiving information transmitted at high speed by allocation of multiple bursts within a transmission frame, each burst initially including information symbols and a learning sequence, associated with a method of transmitting information at high speed by allocation of multiple bursts within a transmission frame, each of said bursts including information symbols and system symbols, the transmitting method including the steps of: allocating to a user a plurality of adjacent bursts; and replacing at least one system symbol of said adjacent bursts with an information symbol to form a superburst, each of said adjacent bursts including information symbols and system symbols, the system symbols being known to a receiver, said system symbols including start symbols, end symbols and a learning sequence, wherein the learning sequence and the information symbols of each of said adjacent bursts are rearranged so that said superburst includes a single learning sequence, the receiving method including the steps of: recognizing reception of said superburst previously obtained by rearranging the learning sequence and the information symbols of each of a plurality of adjacent bursts allocated to the same user; and, in the event that a superburst is recognized, processing said superburst and extracting said information symbols therefrom.

18. The method according to claim 17, wherein the recognizing step includes the reception of information representing a configuration of a superburst, including a number of bursts concatenated in the superburst, a location of the single learning sequence within the superburst and a length of said learning sequence.

19. The method according to claim 18, wherein said single learning sequence includes L guard symbols followed by P reference symbols followed by L guard symbols and the recognizing step further includes reception of positive values for P and L.

20. The method according to claim 18, wherein said single learning sequence includes L guard symbols followed by P reference symbols followed by L guard symbols and the recognizing step further includes reception of a reference number giving positive values for L and P.

21. The method according to claim 18, wherein the recognizing step includes, before each superburst is received, a reception of a specific burst containing said information representing the configuration of said superburst.

22. The method according to claim 18, wherein the recognizing step further includes reception and recognition of information representing a number of frames in which superbursts are used.

23. The method according to claim 18, wherein the recognition step further includes prior reception and recognition of a configuration number associated with a predetermined configuration of superbursts to be received.

24. The method according to claim 17, wherein the transmission frame is a Time Division Multiple Access frame.

25. A device for receiving information transmitted at high speed by allocation of multiple bursts within a transmission frame, said device using a method of receiving information transmitted at high speed by allocation of multiple bursts within a transmission frame associated with a method of transmitting information at high speed by allocation of multiple bursts within a transmission frame, each of said bursts including information symbols and system symbols, in which transmitting method includes a step for allocating to a user a plurality of adjacent bursts, and a step for replacing at least one system symbol of said adjacent bursts with an information symbol to form a superburst, which receiving method includes a step for recognizing reception of a superburst and further includes, in the event that a superburst is recognized, a step for processing said superburst and extracting said information symbols therefrom, wherein the device includes: means for recognizing reception of said superburst generated by implementation of said method of transmitting information at high speed; and means for processing said superbursts received and for extracting therefrom the information symbols contained in the adjacent bursts.

26. A device according to claim 25, wherein the transmission frame is a Time Division Multiple Access frame.

27. A transmitter which transmits information at high speed by allocation of multiple bursts within a transmission frame, each of said bursts including information symbols and system symbols, wherein a user is allocated a plurality of adjacent bursts, and at least one system symbol of said adjacent bursts is replaced with an information symbol to form a superburst.

28. A transmitter according to claim 27, wherein the transmission frame is a Time Division Multiple Access frame.

* * * * *